US009078022B2

(12) United States Patent
Gudlavenkatasiva et al.

(10) Patent No.: US 9,078,022 B2
(45) Date of Patent: Jul. 7, 2015

(54) USAGE BASED BILLING FOR VIDEO PROGRAMS

(75) Inventors: Bhaskar R. Gudlavenkatasiva, Tampa, FL (US); Nityanand Sharma, Tampa, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 146 days.

(21) Appl. No.: 13/237,012

(22) Filed: Sep. 20, 2011

(65) Prior Publication Data

US 2013/0074105 A1 Mar. 21, 2013

(51) Int. Cl.
*H04N 7/16* (2011.01)
*H04N 21/2543* (2011.01)
*H04N 21/24* (2011.01)
*H04N 21/25* (2011.01)
*H04N 21/45* (2011.01)
*H04N 21/442* (2011.01)
*H04N 21/658* (2011.01)

(52) U.S. Cl.
CPC ....... *H04N 21/2543* (2013.01); *H04N 21/2407* (2013.01); *H04N 21/25* (2013.01); *H04N 21/45* (2013.01); *H04N 21/25435* (2013.01); *H04N 21/44204* (2013.01); *H04N 21/6582* (2013.01)

(58) Field of Classification Search
CPC .............. H04N 21/2407; H04N 21/25; H04N 21/2543; H04N 21/45
USPC ........................................... 725/1–8, 86–104
See application file for complete search history.

(56) References Cited

U.S. PATENT DOCUMENTS

| | | | |
|---|---|---|---|
| 7,596,797 B1 * | 9/2009 | Kapner et al. | 725/46 |
| 7,986,935 B1 * | 7/2011 | D'Souza et al. | 705/34 |
| 8,019,683 B1 * | 9/2011 | Swanburg et al. | 725/116 |
| 2003/0124973 A1 * | 7/2003 | Sie et al. | 455/2.01 |
| 2003/0145326 A1 * | 7/2003 | Gutta et al. | 725/46 |
| 2008/0016525 A1 * | 1/2008 | Cai et al. | 725/1 |
| 2008/0077950 A1 * | 3/2008 | Burke et al. | 725/1 |
| 2009/0019488 A1 * | 1/2009 | Ruiz-Velasco et al. | 725/43 |
| 2009/0089844 A1 * | 4/2009 | Beyabani | 725/87 |
| 2010/0064304 A1 * | 3/2010 | Ishizaki et al. | 725/5 |
| 2011/0321072 A1 * | 12/2011 | Patterson et al. | 725/5 |

* cited by examiner

*Primary Examiner* — Jeremy Duffield

(57) ABSTRACT

A method includes identifying a current time that at least one video program is viewed by at least one device associated with at least one user account. An initial billing time that the at least one video program is to be billed associated with the at least one user account may be identified. The method may include determining whether the current time is equal to the initial billing time. At least one coefficient associated with the at least one video program at the current time may be identified in response to a determination that the current time is equal to the initial billing time. The method may include determining a usage based billing for the at least one user account based on the current time that the at least one video program is viewed and the at least one coefficient associated with the at least one video program.

20 Claims, 8 Drawing Sheets

| DATE 152 | DEVICE ID 154 | CHANNEL ID 156 | VIEW START 158 | VIEW END 160 | BROADCAST START 162 | BROADCAST END 164 | CHANNEL TYPE 166 | PROGRAM TYPE 168 |
|---|---|---|---|---|---|---|---|---|
| 5/24/2011 | TV1 | 8 | 5/25 – 8:00 | 5/25 – 8:30 | 5/24 – 12:30 | 5/24 – 13:00 | FREE | DVR |
| 5/24/2011 | TV1 | 189 | 5/25 – 9:00 | 5/25 – 9:30 | 5/24 – 11:00 | 5/24 – 11:30 | REGULAR | DVR |
| 5/24/2011 | TV1 | 214 | 5/25 – 10:00 | 5/25 – 10:40 | N/A | N/A | REGULAR | GENERAL |
| 5/24/2011 | UD1 | 214 | 5/25 – 11:00 | 5/25 – 11:20 | N/A | N/A | REGULAR | GENERAL |
| 5/24/2011 | UD1 | 600 | 5/25 – 12:00 | 5/25 – 12:10 | N/A | N/A | REGULAR | GENERAL |
| 5/24/2011 | TV1 | 621 | 5/25 – 13:00 | 5/25 – 13:20 | N/A | N/A | PREMIUM | GENERAL |
| 5/24/2011 | TV1 | 570 | 5/25 – 14:00 | 5/25 – 16:15 | N/A | N/A | REGULAR | GENERAL |
| 5/24/2011 | TV2 | 4 | 5/25 – 15:00 | 5/25 – 15:22 | N/A | N/A | REGULAR | GENERAL |
| 5/24/2011 | TV2 | 256 | 5/25 – 15:25 | 5/25 – 15:44 | N/A | N/A | REGULAR | GENERAL |
| 5/24/2011 | TV2 | 333 | 5/25 – 16:00 | 5/25 – 16:30 | N/A | N/A | REGULAR | GENERAL |
| 5/24/2011 | UD2 | 739 | 5/25 – 16:31 | 5/25 – 17:00 | N/A | N/A | REGULAR | GENERAL |
| 5/24/2011 | TV3 | 51 | 5/25 – 17:00 | 5/25 – 17:30 | N/A | N/A | REGULAR | GENERAL |
| 5/24/2011 | TV2 | 845 | 5/25 – 17:00 | 5/25 – 17:45 | N/A | N/A | PREMIUM | GENERAL |

USAGE BASED BILLING FOR VIDEO PROGRAMS

BACKGROUND INFORMATION

Video service providers currently provide multiple services and programs, including cable television, network television, and video on demand, to their customers. In some instances, individual customers may receive combinations of these multiple services from a single video service provider. The video service providers manage relationships with their customers using customer accounts that correspond to the multiple services.

BRIEF DESCRIPTION OF THE DRAWINGS

FIG. 1C is an exemplary table of video service information associated with a customer account;

DETAILED DESCRIPTION OF PREFERRED EMBODIMENTS

The following detailed description refers to the accompanying drawings. The same reference numbers in different drawings may identify the same or similar elements. Also, the following detailed description is exemplary and explanatory only and is not restrictive of the invention, as claimed.

Embodiments described herein relate to devices, methods, and systems for determining usage based billing for video programs associated with a customer account in a network. Consistent with the embodiments described herein, usage based billing for a customer account may be determined based on an initial billing time for each video program and at least one coefficient associated with the video program. A video service provider may combine an access fee, for example a fixed monthly charge, with usage based billing and taxes to provide a video services plan that is closely aligned with a customer's usage of video services.

Figure 1A:
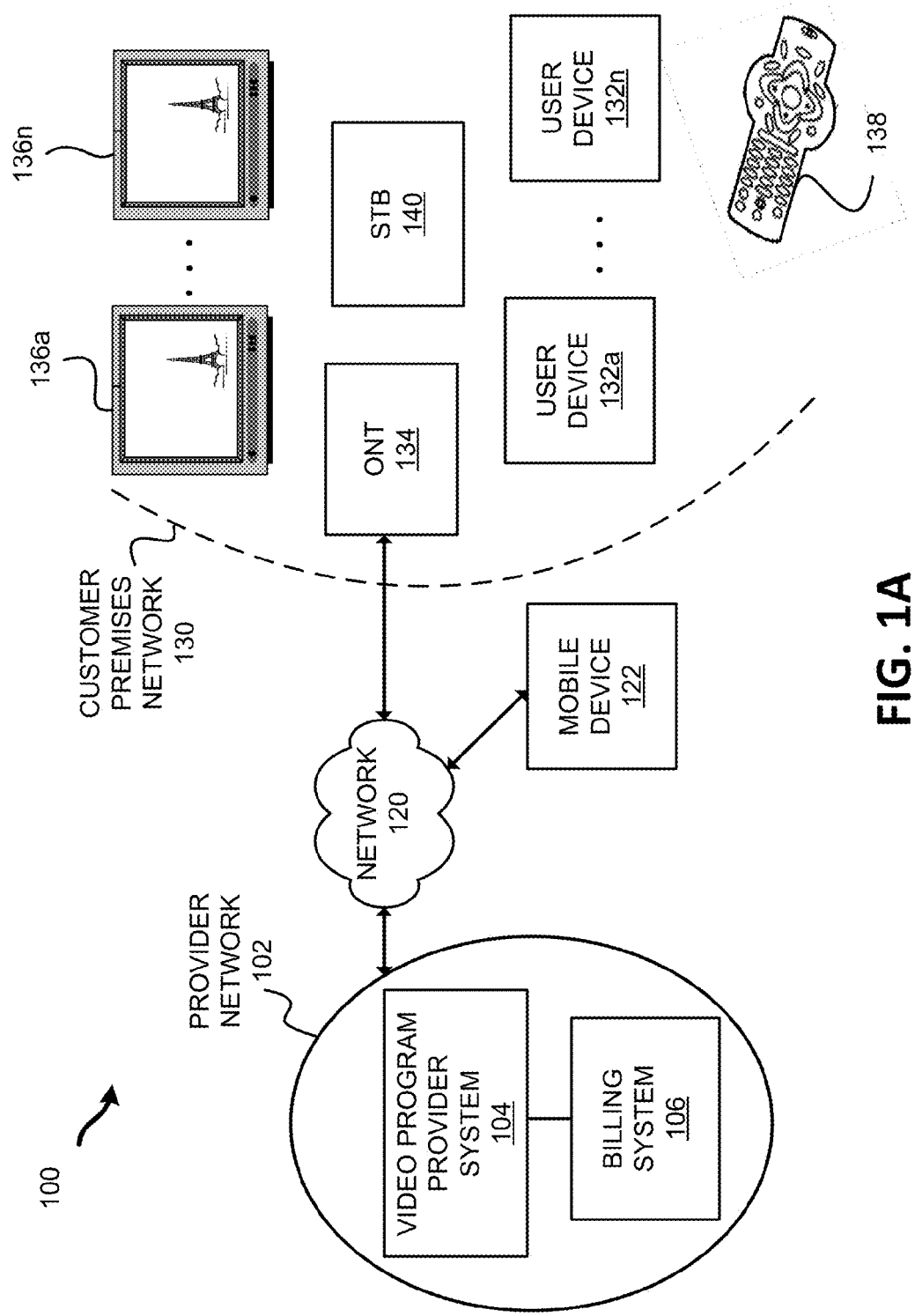
FIG. 1A illustrates an exemplary network in which systems and methods described herein may be implemented.

FIG. 1A is a diagram of an exemplary network 100 in which systems and/or methods described herein may be implemented. As illustrated, network 100 may include a provider network 102, a customer premises network 130 and a mobile device 122. Customer premises network 130 (e.g., the customer's home network) may include a plurality of user devices 132a-132n, an optical network terminal (ONT) 134, a plurality of televisions (TVs) 136a-136n, a remote control 138 and a set-top box (STB) 140. Provider network 102 may include a video program provider system 104 and a billing system 106. Provider network 102, customer premises network 130 and user devices 132a-132n may be interconnected by network 120. Components of network 100 may be interconnected via wired and/or wireless connections. FIG. 1A is discussed in conjunction with FIG. 1B, which illustrates an exemplary video services data table 150.

The configuration of components of network 100 illustrated in FIG. 1A is for illustrative purposes. Although not shown, provider network 102 may also include other components of a provider network for a video service provider such as customer information servers, application servers, security devices, etc., and may manage the customer-provider relationship for a plurality of customers, customer premises networks 130, user devices 132a-132n and STBs 140. Other configurations may be implemented. Therefore, network 100 may include additional, fewer and/or different components than those depicted in FIG. 1A. Also, in some instances, one or more of the components of network 100 may perform one or more functions described as being performed by another one or more of the components of network 100.

Video program provider system 104 may include servers (not shown) that store and provide content, such as video programs. The servers may include one or more distribution devices, and memory/storage devices. Video program provider system 104 may provide video programs to mobile device 122 and/or customer premises network 130. Video program provider system 104 may provide the video programs based on input received from user devices 132a-132n and customer premises network 130. For example, a user may select and authorize billing for content, such as a program or package, by input through a graphical user interface (GUI) of a user device 132. Video program provider system 104 may provide content at a plurality of service levels with corresponding billing rates. For example, a basic level of service may be provided at a basic billing rate, and may include basic (or entry level) programming, such as network television programs, basic cable programs, etc. Other levels of service may be provided at different billing rates, such as specialized programming that includes the basic programming and additional cable channels, pay-per-view (PPV), video on demand (VOD), movies, and/or events, etc.

Billing system 106 may include servers that perform billing for customer accounts associated with customer premises networks 130 (including associated STBs 140 and user devices 132a-132n) and mobile devices 142 and is described hereinbelow with respect to FIG. 1B. Billing system 106 may allow video service providers to offer one or more plans that allow a customer to select programming from premium channels and to be billed on a per program basis. For example, video service providers may offer plans that allow selection of programs from premium channels (and corresponding billing only at these instances) upon receiving specific commands input to user device 132 in contrast to premium packages that provide access to the premium content/channel on a full time basis. Video service providers may thereby provide cost savings to customers that have planned or unplanned dormant periods of video service activity (such as long vacations away from customer premises 130).

User devices 132a-132n may be computers, phones, tablets, etc. User devices 132a-132n may receive/display content from provider network 102. Each user device 132 may include a GUI through which a user may select content that may be provided by video program provider system 104. According to one embodiment, user devices 132a-132n may be implemented in conjunction with customer premises network 130 and may be authenticated/identified to particular customer accounts (e.g., user accounts) at provider network 102 through (in conjunction with) an associated STB 140.

ONT 134 may receive data, e.g., on a fiber optic cable, and may transfer the data to the appropriate device in customer premises network 130, such as STB 140. Likewise, ONT 134 may receive data from any device in customer premises network 130 and may transmit the data to other devices in customer premises network 130, e.g., through copper wires. ONT 134 may provide customer premises network 130 with television access, Internet access, or telephone service, for example. ONT 134 may receive data (including video programs) on the fiber optic cable from provider network 102. Additionally, ONT 134 may output data to provider network 102 through network 120.

TVs 136a-136n may include speakers as well as a display. A single television may be referred to as TV 136. TVs 136a-136n may play content, for example, received from STB 140. While some embodiments described below may use TVs 136a-136n to view content, other embodiments may use any device (e.g., a computer or a mobile phone) to display/provide content. Similarly, although some embodiments may be described below with respect to user devices 132a-132n, the principles disclosed may be applied to TVs 136a-136n and/or STB 140.

Remote control 138 may issue commands for controlling other electronic devices, such as TV 136 or STB 140. Remote control 138, in conjunction with STB 140, may allow a user to interact with an application running on STB 140. In some instances, other types of devices (e.g., a keyboard, mouse, mobile phone, etc.) may be used instead of remote control 138.

STB 140 may receive content from provider network 102 and output the content to TV 136 and/or user devices 132a-132n for display. STB 140 may include a component (e.g., a cable card or a software application) that plugs into a host device (e.g., TVs 136a-136n, and/or user devices 132a-132n, such as a personal computer, a stereo system, etc.) that allows the host device to display content. STB 140 may also be implemented as a home theater personal computer (HTPC), an optical disk player (e.g., digital video disk (DVD) or Blu-Ray™ disc player), a cable card, etc. STB 140 may receive commands from other devices in network 100, such as remote control 138. STB 140 may include one or more digital video recorders (DVRs) that allow STB 140 to record content and to playback the recorded content at a later time. In one embodiment, STB 140 may include a microphone and/or a camera.

STB 140 may include a component (e.g., a software application an application specific integrated circuit (ASIC), field programmable gate array (FPGA), etc.) that may collect video service usage data regarding content (including video programs) received by STB 140. STB 140 may output the video service usage data to provider network 102.

Mobile device 122 may be a computer, phone, tablet, etc., that may receive/display content from provider network 102 through one or more wired and/or wireless networks, such as network 120. Mobile device 122 may include an application that may collect data regarding content (including video programs) received by mobile device 122 and outputs the video service usage data to provider network 102.

Network 120 may include one or more wired and/or wireless networks that are capable of receiving and transmitting data, voice and/or video signals, including multimedia signals that include voice, data and video information. Network 120 may include one or more wireless/mobile networks and/or a public switched telephone network (PSTN). Network 120 may include one or more packet switched networks, such as an Internet protocol (IP) based network, a local area network (LAN), a wide area network (WAN), a personal area network (PAN), an intranet, the Internet, or another type of network that is capable of transmitting data. Network 120 may include one or more high-speed data networks, such as a very high performance backbone network services (vBNS) network.

Provider network 102 may be implemented in network 100 to provide content, including video programs, to customer premises networks 130 associated with a customer account in network 100, and associated devices, such as TVs 136a-136n and user devices 132a-132n. Provider network 102 may also provide video programs to mobile devices 122 associated with a customer account in network 100. Provider network 102 may collect video service usage data for devices associated with a customer account and implement billing associated with the customer account based on each video program viewed by the customer for all devices associated with the customer account. Provider network 102 implements billing for the customer account using billing system 106.

Figure 1B:
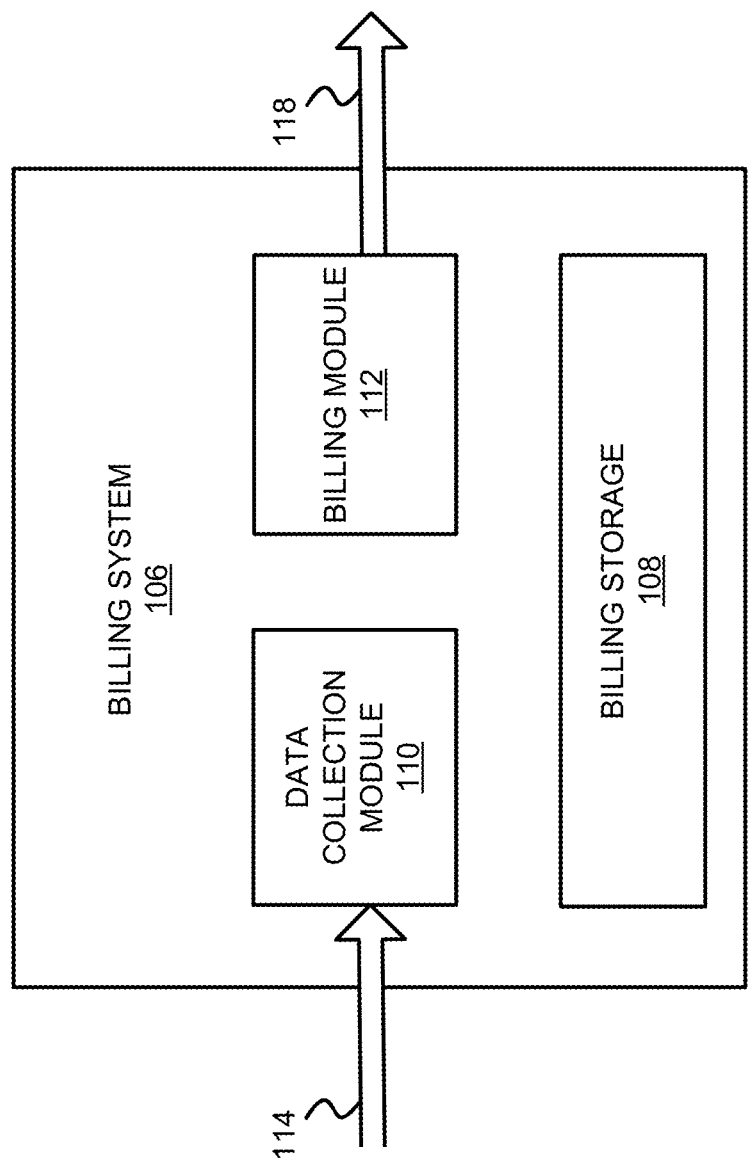
FIG. 1B illustrates an exemplary billing system.

FIG. 1B illustrates an exemplary functional block diagram of a billing system 106. Billing system 106 includes a billing storage 108, a data collection module 110, and a billing module 112. The configuration of components of system 106 illustrated in FIG. 1B is for illustrative purposes. Other configurations may be implemented. Therefore, system 106 may include additional, fewer and/or different components than those depicted in FIG. 1B. FIG. 1B is discussed in conjunction with FIG. 1C, which illustrates an exemplary video services data table 150. Although FIG. 1C shows particular video service usage data, it should be understood that other video service usage data may be collected by data collection module 110 according to particular implementations of billing system 106.

Data collection module 110 may collect video service usage data 114 from STBs 140, user devices 132a-132n and mobile devices 122. Video service usage data 114 may be data associated with video programs selected, recorded and viewed by a customer using associated devices, such as STBs 140, user devices 132a-132n and mobile devices 122. An example of video service usage data is shown in a video service data table 150 in FIG. 1C. Video service usage data 114 may be used to determine video service usage and video service billing for a customer account and/or associated user device 140. Data collection module 110 may collect video service usage data 114 at predetermined intervals, such as daily or hourly for each customer premises network 130 and/or customer account that may be output by STB 140. Alternatively, data collection module 110 may collect video service usage data 114 based on particular commands received from user devices 132a-132n. According to one implementation, data collection module 110 may collect video service usage data 114 at predetermined instances, such as each time there is a change in the channel number or a DVR program is accessed.

Video service data table 150 may include video service usage data 114 that includes a date 152 (such as a date that a video program is received, for example May 24, 2011 as shown in first row, first column of table 150), device identification (ID) 154 (such as a particular user device 132 or TV 136 that receives the video service, for example TVs 136 (TV1 to TV3) and user devices 132 (UD1 to UD2) as shown in table 150), channel ID 156 (such as a number and/or name of a particular channel received, for example channel 4, NBC (not shown)), view start 158 (e.g., an actual or real time that an event viewing begins), view end 160 (e.g., an actual time that a program viewing ends), broadcast start 162 (e.g., an actual time that an event recording begins for DVR programs), broadcast end 164 (e.g., an actual time that an event recording ends for DVR programs), channel type 166 (such as free to air, premium channel, promotional, etc.), and program type 168 (such as movie, live event (e.g., a sports league championship game), DVR recording, etc.).

According to one implementation, STB 140 may collect video service usage data 114 at a particular customer premises network 130. The video service usage data 114 may be stored in a memory or storage device (not shown) associated with STB 140 as a video service data table 150 (FIG. 1C) associated with a particular customer account. STB 140 may output the video service data table 150 to data collection module 110 via network 120, for instance daily or at a close of a billing period.

Data collection module 110 may collect and aggregate video service usage data 114 for each customer. Data collection module 110 may collect video service usage data for multiple customer premises network 130, mobile devices 122, etc., associated with a customer account. Data collection module 110 may aggregate video service usage data 114 according to a number of hours that a TV 136 is viewed per day, types of channels (e.g., using channel ID 156, shown in FIG. 1B) being viewed and an amount of time spent on each channel (e.g., using view start 158, and view end 160, shown in FIG. 1B), a time frame when TV 136 is most viewed etc. Video service providers may determine targeted content and advertisements based on the aggregated video service usage data 114.

Billing module 112 may determine billing using a predetermined pricing plan based on video service usage data 114 for the customer account, including a viewing time for each program viewed and one or more billing coefficients for each program viewed. For example, billing module 112 may determine billing 116 for a customer account using a pricing model, such as $$\text{Usage based billing} = \text{SUM of}(CC*TC*EC*\text{viewing time for each program}*BC \text{ for channels 1 to } n). \quad (1)$$

In expression (1), channel coefficient (CC) is a coefficient/ranking indicator for the kind of channel being watched. Time coefficient (TC) is a coefficient/ranking indicator for a time window during which a program is viewed. Event coefficient (EC) is a coefficient that indicates particular events. For example, event coefficient may be determined based on program type 168 and may indicate that an event is a general event, a live event, a recorded program (DVR video program), a limited time event, etc. Channel billing coefficient (BC) is a coefficient that may be set to 0 for all channels that are to be free to air for viewing (such as educational channels or broadcast message channels for a particular county, e.g., a program on channel 8 in FIG. 1C). Viewing time for each program may be a net watch time by the customer for the program (measured for instance in periodic increments, such as minutes, hours, etc.). The coefficients in expression (1) may vary based on different factors, such as whether a premium channel or regular channel is viewed (e.g., channel type 166 shown in FIG. 1C), a time at which the channel is viewed, etc.

The result of expression (1) (i.e., the left side of expression (1)) may be multiplied by a predetermined base billing rate, such as a billing rate of $1 for every 100 minutes viewed per channel, to determine a dollar amount of billing 116 for the customer account. Each program may have different values for coefficients determined, for instance, based on a table of coefficients and corresponding values for each coefficient (not shown) input to billing module 112 by a video service provider.

According to one implementation, a premium cable network (such as Cinemax, HBO, etc.) may have a higher CC value versus a regular channel (such as PBS, NBC, etc.). According to another implementation, a program viewed in a time range of 5 pm to 9 pm may have a higher TC value when compared to a program viewed in a time range of 12 am to 4 am. Different time windows may be assigned for usage based billing with different TC values for each time window. For example, 12 am to 4 am may be assigned a TC value of 0.1, 4 am to 8 am may be assigned a TC value of 0.2, etc. According to another implementation, events such as championship games may be assigned a higher EC value when compared to other events.

According to one implementation, billing module 112 may determine billing using video service usage data 114 for a same program that is viewed in multiple instances and/or at multiple user devices 132a-132n as a single billing instance (i.e., a single payment covers viewing of a same program multiple times). For example, billing module 112 may determine a first time that the video program is received by the multiple user devices 132a-132n based on the plurality of times the same program is viewed (e.g., a first viewing or recording time for the video program). Billing module 112 may identify the first time as an initial billing time at which the video program is to be billed to the customer account. The initial billing time is a time at which coefficients are determined for purposes of billing the customer account for the video programs. Further, billing module 112 may determine a viewing time for each program (measured for instance in minutes).

Billing module 112 may determine a prospective billing plan that more closely aligns with the viewing pattern (i.e., a customer's viewing habits) than a current billing plan and output an alert to a user device 132a-140n associated with a customer account informing the customer of the availability of the prospective plan. A video service provider may alert customers to potential savings that may be gained by using usage based billing instead of a flat rate each month. The video service provider may also recommend various pricing plans based on an amount of time that a customer views particular programs. Different pricing plans may be based on different video programs viewed at different times. For example, billing module 112 may analyze video service usage data 114 and determine a viewing pattern associated with a customer account. Billing module 112 may determine savings that a customer may gain by changing to a particular usage based billing plan based on the viewing pattern.

According to one implementation, billing module 112 may determine billing based on usage of a DVR (for instance included in STB 140) associated with the customer account. For example, billing module 112 may determine that programs recorded by the DVR at a broadcast time and viewed at a later time are to be billed at a rate associated with the broadcast time. The broadcast time may be a time at which the video program is initially received or a time associated with a DVR recording of the video program. The broadcast time may be a time at which the video program is initially received at STB 140 or other device that includes the DVR and records the program for later viewing. Billing module 112 may determine that multiple viewings of a same DVR recording are to be billed once and at a billing rate associated with the broadcast time. Further, billing module 112 may determine that multiple viewings of the same DVR recordings on multiple user devices 132a-132n associated with a single customer account are to be billed once and at the billing rate associated with the single customer account and the initial broadcast time.

According to another implementation, billing module 112 may determine that PPV and VOD usage is to be excluded when determining billing for the customer account using video service usage data 114. Billing module 112 may determine that programs purchased/rented using VOD and/or PPV are to be billed at a purchased rate and not based on video service usage data 114. For example, billing module 112 may determine that a video program is a PPV or VOD program. Billing module 112 may provide a zero value coefficient for PPV and VOD programs. In response to a determination that the video program is not a PPV or VOD program, billing module 112 may identify the time that the video program is viewed or received as the initial billing time for the video program.

According to another implementation, billing module 112 may determine billing based on a plurality of users associated with a particular customer account. The users may be collectively allocated a predetermined amount of shared minutes for viewing content provided from provider network 102 by the video service provider. For example, the video service provider may offer a group and/or family plan that allows users in different locations to network their user devices 132a-132n (in particular DVR recordings of programs, for instance as described with respect to FIG. 2) and share/view the recorded programs with a single billing instance determined by billing module 112 for a particular program that is shared among the user devices 132a-132n. Further, the video service provider may allow a customer to aggregate billing for multiple locations and/or multiple customer accounts at a discounted billing rate.

Figure 2:
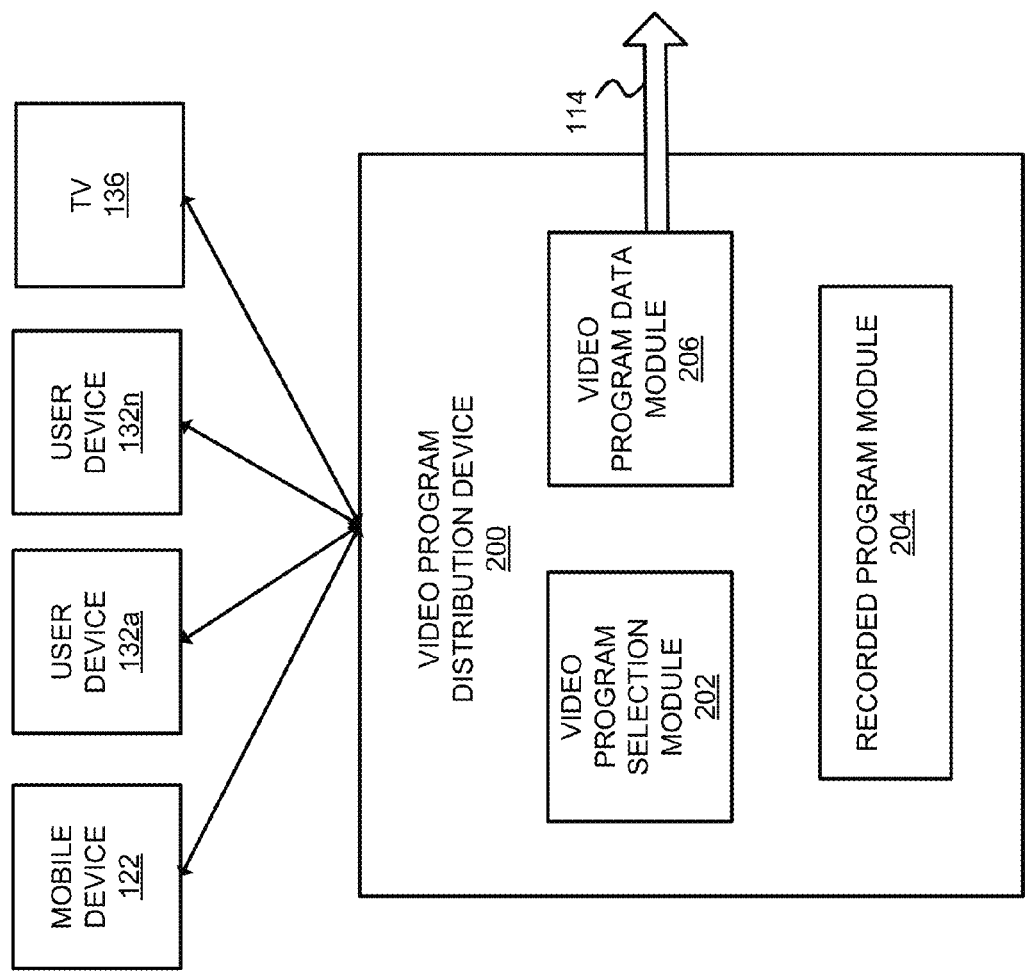
FIG. 2 illustrates an exemplary video program distribution device.

FIG. 2 illustrates an exemplary functional block diagram of a video program distribution device 200. Device 200 may be implemented as a stand-alone device or as a component of (or in conjunction with) STB 140, a user device 132, mobile device 122, a network device in customer premise network 102, billing module 112 etc. Device 200 includes a video program selection module 202, a recorded video program module 204, and a video program data module 206. The configuration of components of device 200 illustrated in FIG. 2 is for illustrative purposes. Other configurations may be implemented. Therefore, device 200 may include additional, fewer and/or different components than those depicted in FIG. 2.

Video program distribution device 200 may be implemented for customer premises network 130 and/or network 100, to manage video programs associated with a particular customer account. Video program distribution device 200 may provide shared access to particular video programs for user devices 132a-132n, mobile device 122 and TVs 136a-136n associated with a particular account.

Video program selection module 202 may include a data base (not shown) of video programs associated with the customer account (for instance for a particular billing cycle). The video programs may include programs that have been billed in a current billing cycle and/or recorded programs. A customer may provide access to content via network 100 to other users that have been provided appropriate authorization and authentication. For example, a customer may provide a passcode for friends and family to view content purchased from the video service provider.

According to one implementation, video program selection module 202 may receive a video program selection query from a customer device associated with the customer account. The video program selection query may be a request for information regarding available video programs that a customer may view without further billing to the customer account. These video programs may include video programs that have been previously viewed and billed within a current billing cycle and/or video programs that have been recorded by a DVR associated with the customer account and implemented on a device in the customer network 130. Video program selection module 202 may enable a customer to view/receive the video programs in conjunction with provider network 102 (for instance streaming the video programs a second time) and/or recorded program module 204.

Recorded program module 204 may determine whether particular video programs have been recorded by the customer (e.g., using STB 140) and indicate the availability of the recorded video programs to devices associated with the customer account. For instance, user devices 132a-132n, mobile device 122 and STBs 140 associated with the customer account may receive the recorded video programs from recorded program module 204 when the recorded video programs are selected from among recorded programs on the customer device. In this instance, a device that includes video program distribution device 200 may include video streaming capabilities (e.g. a user device 132 that includes a video streaming application or provider network 102) and output the video program from the device to the requesting device (e.g., in customer premises network 130 or network 100 via network 120).

Video program data module 206 may collect video service usage data 114 regarding shared video programs distributed by video program distribution device 200 and output the video service usage data 114 to billing module 112 of billing system 106 in FIG. 1B in provider network 102. Video program data module 206 may indicate one or more associated customer accounts and/or customer premises network for the video service usage data 114 that is output to billing module 112.

Figure 3:
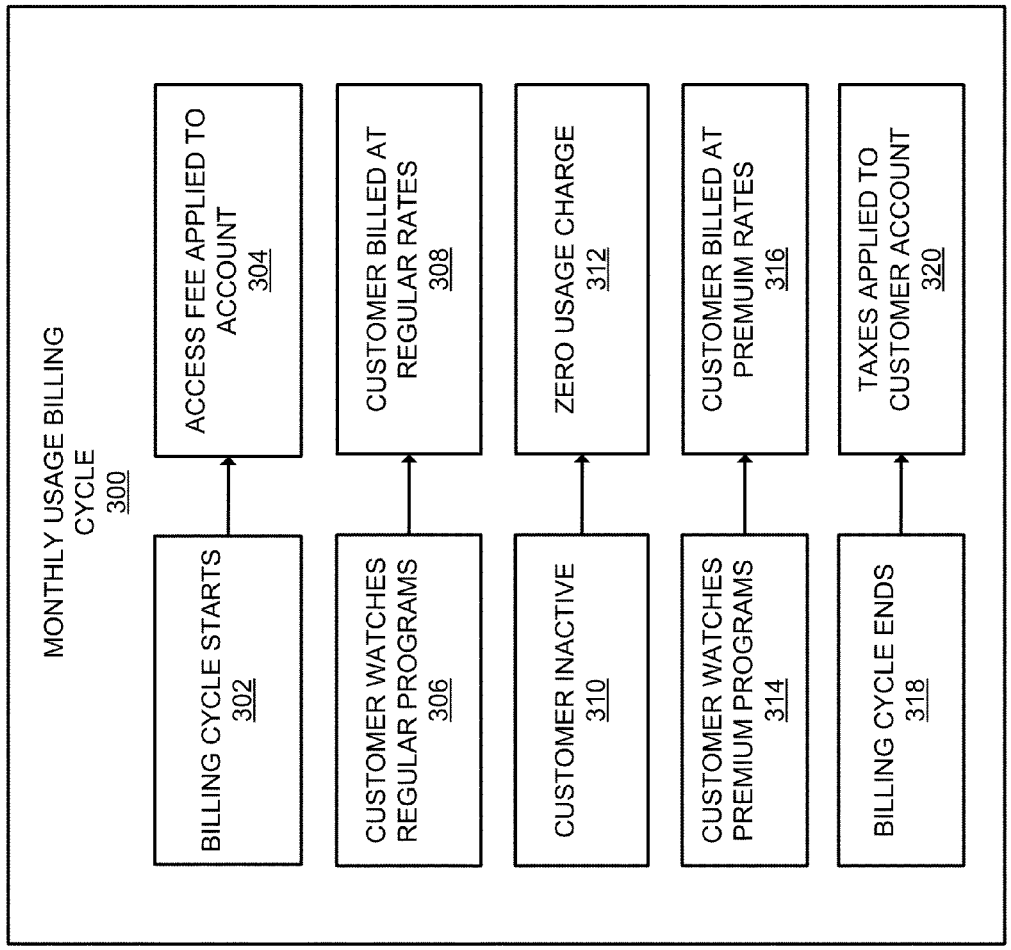
FIG. 3 illustrates an exemplary monthly usage based billing.

FIG. 3 illustrates an exemplary monthly usage billing cycle table 300 of a video services associated with a customer account. Monthly usage billing cycle table 300 may be implemented for a customer account that corresponds to one or more devices, such as STB 140, user device 132, or mobile device 122.

As shown in table 300, at a start of billing cycle (302), an access fee may be applied to the customer account (304). The access fee may be a flat fee that is applied to the customer account regardless of video program service usage and may cover costs, such as equipment fees, regulatory fees, etc.

During the billing cycle, the customer may watch regular programs (306). In these instances the customer is billed at regular rates (308). The customer may also be inactive (310) for portions or all of the billing cycle. For example, the customer may be on vacation and not access any video programs during the customer's vacation. Alternatively, the customer may be a student that decreases average (or eliminates) video program service usage during study periods or examination periods. In these instances, the customer is charged at a zero usage charge rate (312). The customer may also watch premium programs (314). The customer may be billed at premium rates (316) when the customer watches premium programs.

The customer account may be determined by adding all the usage based billing to the access fee. When the billing cycle ends (318), taxes may be applied to the customer account (320) to determine combined usage based billing for the billing cycle for the customer. Different usage billing rates may be applied at different times of a billing cycle based on a customer's viewing patterns. For example, during a particular day a customer may be billed at an inactive rate until the evening when the customer first turns on a customer device associated with the customer account. The customer may then be billed at a regular rate while watching regular programs and a premium rate when the customer changes to a premium program.

Figure 4:
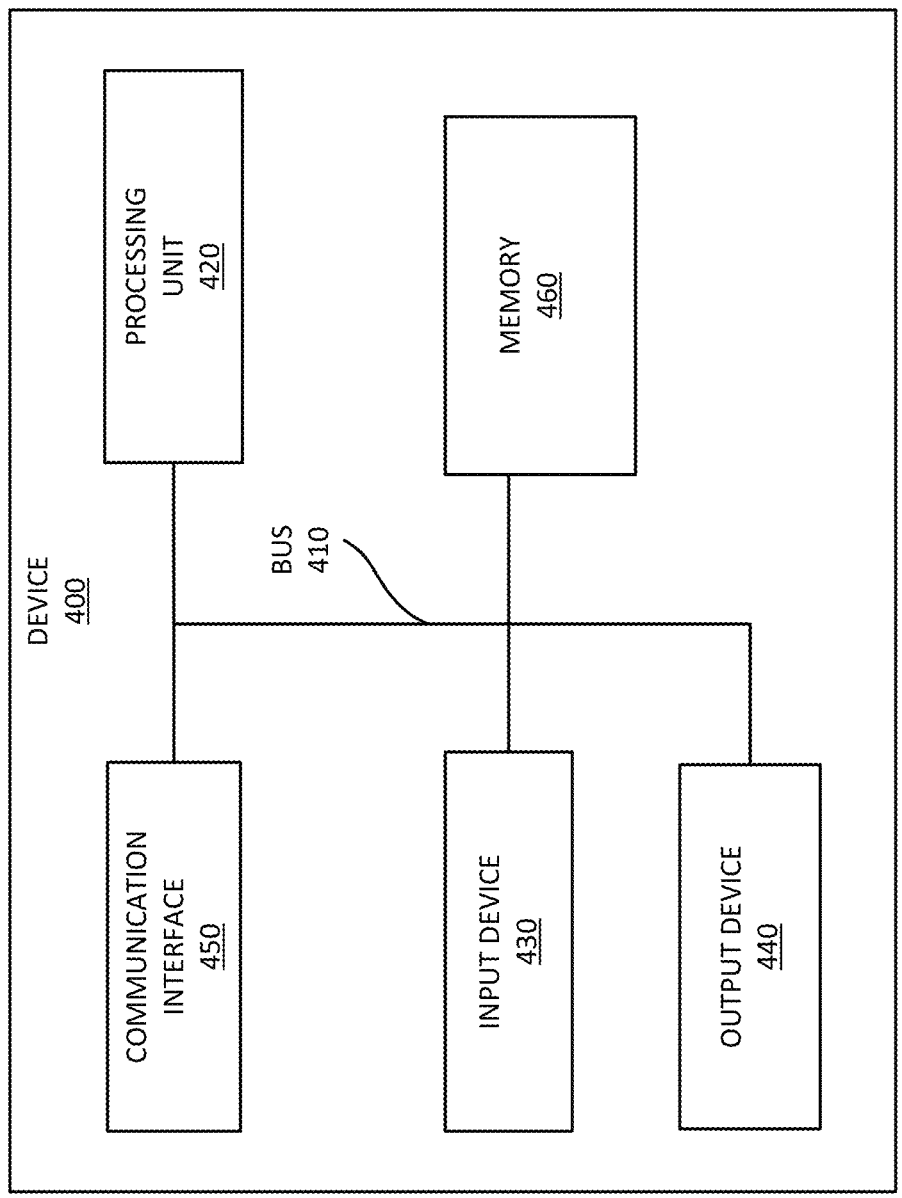
FIG. 4 illustrates an exemplary configuration of one or more of the devices of FIG. 1A.

FIG. 4 is a diagram of exemplary components of a device 400. Device 400 may correspond to STB 140, user device 132, mobile device 122, video program provider system 104, billing system 106 or components of billing system 106, such as data collection module 110 and billing module 112. Each of STB 140, user device 132, mobile device 122, video program provider system 104, billing system 106 or components of billing system 106 may include one or more devices 400. As shown in FIG. 4, device 400 may include a bus 410, a processing unit 420, a memory 460, an input device 430, an output device 440, and a communication interface 450. Bus 410 may permit communication among the components of device 400. Processing unit 420 may include any type of processor or microprocessor that interprets and executes instructions. In other implementations, processing unit 420 may be implemented as or include an application specific integrated circuit (ASIC), field programmable gate array (FPGA), or the like. Memory 460 may include a random access memory (RAM) or another type of dynamic storage device that stores information and instructions for execution by processing unit 420, a read only memory (ROM) or another type of static storage device that stores static information and instructions for processing unit 420, and/or some other type of magnetic or optical recording medium and its corresponding drive for storing information and/or instructions.

Input device 430 may include a device that permits an operator to input information to device 400, such as a keyboard, a keypad, a mouse, a pen, a microphone, a remote, etc. Output device 440 may include a device that outputs information to the operator, such as a display, a speaker, etc.

In an exemplary implementation, device 400 may perform operations in response to processing unit 420 executing sequences of instructions contained in a computer-readable medium, such as memory 460. A computer-readable medium may be defined as a physical or logical memory device. The software instructions may be read into memory 460 from another computer-readable medium (e.g., a hard disk drive (HDD), solid state drive (SSD), etc.), or from another device via communication interface 450. Alternatively, hard-wired circuitry may be used in place of or in combination with software instructions to implement processes consistent with the implementations described herein. Thus, implementations described herein are not limited to any specific combination of hardware circuitry and software.

Figure 5:
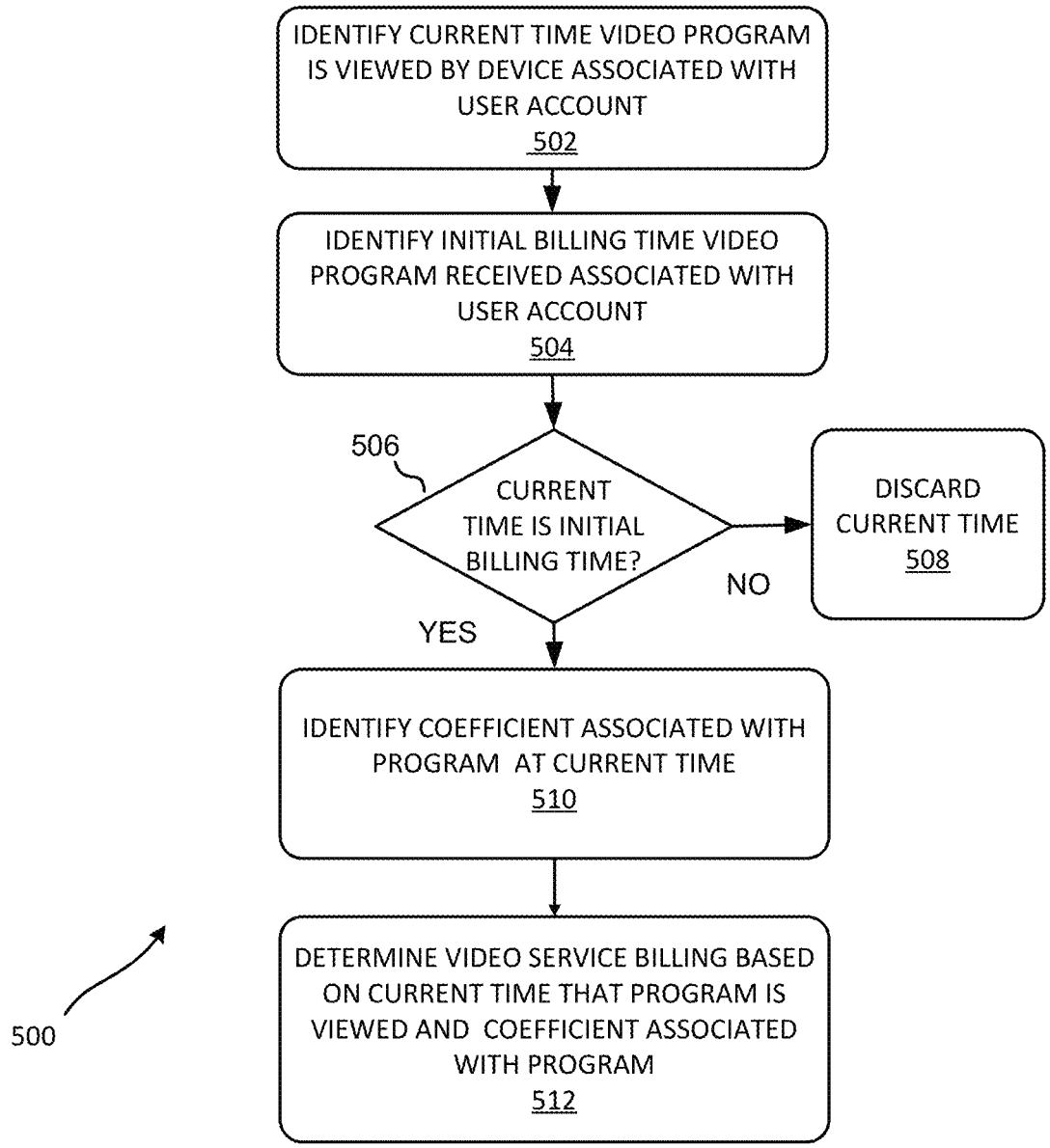
FIG. 5 is a flowchart of an exemplary process for determining usage based billing for video programs associated with a customer account in a network.

FIG. 5 is a flowchart of an exemplary process 500 for determining usage based billing for video programs associated with a customer account in a network 100. Exemplary video service usage data 114 associated with process 500 is described in conjunction with video services data table 150 in FIG. 1C. Process 500 may execute in billing module 112. It should be apparent that the process discussed below with respect to FIG. 5 represents a generalized illustration and that other elements may be added or existing elements may be removed, modified or rearranged without departing from the scope of process 500.

At block 502, billing module 112 may identify a current time that a video program (or video programs) is viewed by a device associated with a user account. The current time that a video program is viewed is a span of time from a start of viewing the video program to an end of viewing the video program. For example, billing module 112 may receive a broadcast start 162 and a broadcast end 164 for a program viewed by a user device 132 associated with the customer account. Billing module 112 may determine the span of time between broadcast start 162 and broadcast end 164.

At block 504, billing module 112 may identify an initial billing time that a video program (or video programs) is viewed by a customer associated with a user account. The initial billing time that a video program is viewed corresponds to an instance of viewing the video program for which the customer account may be billed. The initial billing time may be a first time that the customer views the video program. According to one implementation, the customer may view the program in a particular time window. Billing module 112 may bill the customer account for the video program at a rate associated with the time window. Billing module 112 may not charge for subsequent viewings of the video program by devices associated with the customer account (or alternatively, charge at a reduced rate).

According to another implementation, the initial billing time may be a time that the video program is received at customer premises network 130, for example via a DVR recording at STB 140. Billing module 112 may receive a broadcast start 162 (e.g., a time that the video program is first received) and a broadcast end 164 (e.g., a time that receipt of the video program ends) for a program viewed by a TV 136 or a user device 132 associated with the customer account. The span of time from broadcast start 162 to broadcast end 164 may be the initial billing time in this instance.

At block 506, billing module 112 may determine whether the current time is the initial billing time. For example, billing module 112 may receive video service usage data 114 associated with a customer account from STB 140. Billing module 112 may determine whether the video program had been previously recorded or viewed by a device associated with the customer account. Billing module 112 may discard the current time in response to a determination that the current time is not the initial billing time (block 508). For example, a later viewing of a same video program that has been previously viewed in the current billing cycle may not be billed (or alternatively, billed at a reduced rate).

At block 510, billing module 112 may identify a coefficient (or coefficients) associated with the video programs in response to a determination that the current time is not the initial billing time. For example, billing module 112 may receive video service usage data 114 associated with a customer account from STB 140. Billing module 112 may identify coefficients associated with the video programs at the current time.

According to one implementation, billing module 112 may compare video service usage data 114 for the customer account with a table of coefficients and corresponding values for each coefficient to determine billing values for video service usage for the customer account. For example, video service usage data 114 may indicate that a program was viewed during a particular time window (e.g., as shown in table 150, a program is viewed on UD1 (corresponding to a first user device 132) on channel 214 between 11:00 and 11:20). Billing module 112 may apply a particular TC based on the time window in which the program was viewed. Additional coefficients may be applied including an event coefficient (in this instance program type 168 is a general event).

At block 512, billing module 112 may determine a usage based billing for the user account based on the times that the video programs are viewed and the coefficient(s) associated with the video programs. For example, billing module 112 may apply the pricing model in expression (1) shown above to coefficients and viewing time associated with each program viewed and associated with the customer account to determine usage based billing for the customer account.

According to one implementation, billing module 112 may determine combined billing for a customer account based on usage based billing and additional fees for video service usage associated with the customer account. The additional fees may include an access fee and other equipment fees. The access fee may be a predetermined fee that is independent of video service usage. For example, the access fee may be a fixed monthly charge.

Figure 6:
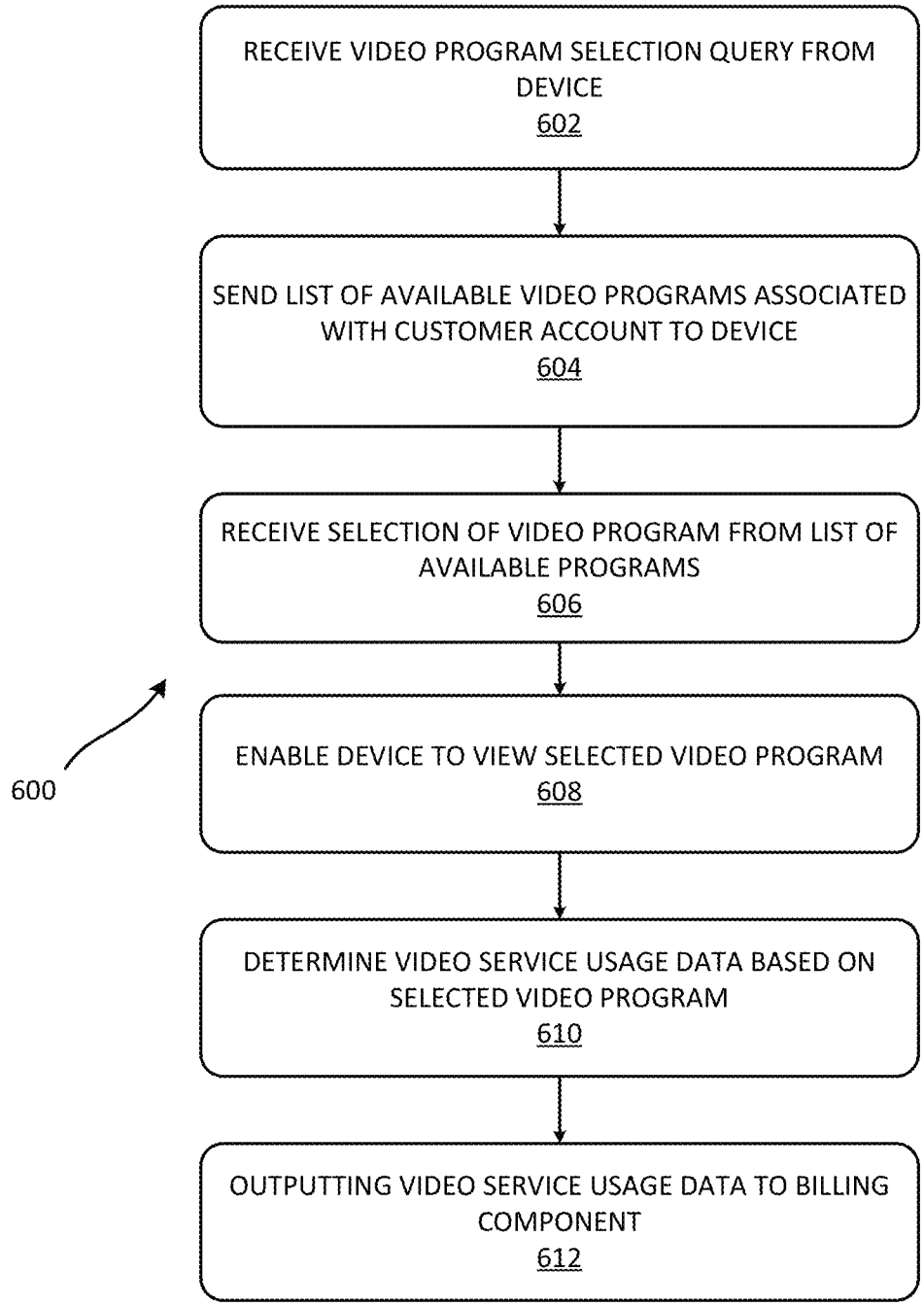
FIG. 6 is a flowchart of an exemplary process for collecting video program data for a plurality of devices associated with a customer account in a network.

FIG. 6 is a flowchart of an exemplary process 600 for determining usage based billing for collecting video service usage data 114 associated with a customer account in network 100. Exemplary video service usage data 114 associated with process 600 are described in conjunction with video services data table 150 in FIG. 1C. Process 600 may execute in video program distribution device 200, described with respect to FIG. 2 above. It should be apparent that the process discussed below with respect to FIG. 6 represents a generalized illustration and that other elements may be added or existing elements may be removed, modified or rearranged without departing from the scope of process 600.

At block 602, video program selection module 202 may receive a video program selection query from a device associated with a customer account, such as STB 140, user devices 132a-132n, etc. The device associated with the customer account may be authenticated and authorized to receive video programs associated with the video program distribution device 200 and/or customer account.

At block 604, video program selection module 202 may send available video programs associated with the customer account to the requesting device. Video program selection module 202 may receive a selection of a video program from the requesting device (block 606).

At block 608, video program selection module 202 may enable the requesting device to receive the video program. For example, content selection module may provide a video program that had been previously recorded on DVR to the requesting device in conjunction with recorded program module 204. Video program selection module 202 may also output data regarding video programs selected to video program data module 206.

At block 610, video program data module 206 may determine video service usage data 114 based on the selected video programs. Video program data module 206 may output the video service usage data 114 to a billing component or device, for example billing system 106 in provider network 102 (block 612). The video service usage data 114 may be output at predetermined instances, for example daily, to be used in determining usage based billing for the customer account.

Embodiments described above relate to devices, methods, and systems for determining usage based billing for video programs associated with a customer account in a network 100. Consistent with the embodiments described above, usage based billing for a customer account may be determined based on a time that each video program is viewed, for example at each of user device 132a-140n, and at least one coefficient associated with each video program.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments. For example, while series of blocks have been described with respect to FIG. 3, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Although the implementations described above mainly refer to a video service provider billing a customer account, in other implementations, other types of customer-provider relationships may be supported and that billing may be provided for combinations of multiple customer accounts and/or user devices 132a-132n, mobile devices 142 or customer premises networks 130 associated with a customer account.

Further, certain portions of the invention may be implemented as a "component" that performs one or more functions. These components may include hardware, such as a processor, an ASIC, or a FPGA, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computer-implemented method comprising:
identifying a current time during which at least one video program is viewed by at least one device associated with at least one user account, wherein the current time that the at least one video program is viewed is a span of time from a start of viewing the at least one video program to an end of viewing the at least one video program;
identifying an initial billing time associated with the at least one video program;
determining whether the current time substantially corresponds to the initial billing time;
identifying at least one coefficient associated with the at least one video program in response to a determination that the current time substantially corresponds to the initial billing time;
determining a usage based billing for the at least one user account based on the current time during which the at least one video program is viewed and the at least one coefficient associated with the at least one video program, wherein determining the usage based billing comprises using:
usage based billing=SUM of (CC*TC*EC*viewing time for each program* BC for each of channels 1 to n),
wherein CC (channel coefficient) is a coefficient indicator for a type of channel, TC (time coefficient) is a coefficient indicator for a time window during which the at least one video program is viewed, EC (event coefficient) is a coefficient that indicates a particular event, BC (channel billing coefficient) is a coefficient that is set to 0 for channels that are free to air for viewing, and the viewing time for each program is the time that at least one video program is viewed associated with the at least one user account;

analyzing video service usage data to determine a viewing pattern for video programs, wherein the video service usage data identifies content including video programs selected, recorded, or viewed in association with the at least one user account;

determining whether a prospective billing plan provides savings with the viewing pattern for video programs when compared with a current billing plan; and outputting a message regarding an availability of the prospective billing plan in response to a determination that the prospective billing plan provides savings with the viewing pattern for video programs when compared with the current billing plan.

2. The computer-implemented method of claim 1, further comprising:

identifying an access fee associated with the at least one user account; and determining a combined billing for the at least one user account based on the usage based billing and the access fee.

3. The computer-implemented method of claim 1, wherein determining whether the current time substantially corresponds to the initial billing time further comprises:

identifying the initial billing time as a broadcast time for the at least one video program, wherein the broadcast time is one or more of a time during which the at least one video program is initially received or a span of time associated with a digital video recording of the at least one video program; and determining whether the current time substantially corresponds to the broadcast time.

4. The computer-implemented method of claim 1, wherein identifying the initial billing time further comprises:

identifying a plurality of times that the at least one video program is viewed by a plurality of user devices;

determining a first time during which the at least one video program is viewed based on the plurality of times that the at least one video program is viewed by the plurality of user devices; and identifying the first time as the initial billing time.

5. The computer-implemented method of claim 1, wherein identifying the initial billing time associated with the at least one video program further comprises:

determining whether the at least one video program is one of a pay per view (PPV) program or a video on demand (VOD) program; and identifying a time during which the at least one video program is viewed as the initial billing time in response to a determination that the program is not one of a PPV program or a VOD program.

6. The computer-implemented method of claim 1, wherein identifying the current time during which the at least one video program is viewed, further comprises:

identifying one or more of a view start, a view end, a broadcast start, or a broadcast end, wherein the view start is a time that viewing begins for the at least one video program, the view end is a time that viewing ends for the at least one video program, broadcast start is a time that receiving the at least one video program begins for the at least one video program, and broadcast end is a time that receiving the at least one video program ends for the at least one video program.

7. The computer-implemented method of claim 1, further comprising:

receiving a view program selection query from the at least one device;

sending a list of available video programs associated with the at least one user account to the at least one device;

receiving a selection of a video program from the list of available video programs; and enabling the at least one device to receive the selected video program.

8. The computer-implemented method of claim 7, further comprising:

determining video service usage data based on the selected video program; and outputting the video service usage data to a billing device.

9. A device, comprising:

a memory to store a plurality of instructions; and a processor configured to execute instructions in the memory to:

identify a current time during which at least one video program is viewed by at least one device associated with at least one user account, wherein the current time that the at least one video program is viewed is a span of time from a start of viewing the at least one video program to an end of viewing the at least one video program;

identify an initial billing time associated with the at least one video program;

determine whether the current time substantially corresponds to the initial billing time;

identify at least one coefficient associated with the at least one video program in response to a determination that the current time substantially corresponds to the initial billing time;

determine a usage based billing for the at least one user account based on the current time during which the at least one video program is viewed and the at least one coefficient associated with the at least one video program, wherein determining the usage based billing comprises using:

usage based billing=SUM of (CC*TC*EC*viewing time for each program*BC for each of channels 1 to n), wherein CC (channel coefficient) is a coefficient indicator for a type of channel, TC (time coefficient) is a coefficient indicator for a time window during which the at least one video program is viewed, EC (event coefficient) is a coefficient that indicates a particular event, BC (channel billing coefficient) is a coefficient that is set to 0 for channels that are free to air for viewing, and the viewing time for each program is the time that at least one video program is viewed associated with the at least one user account;

analyze video service usage data associated with the at least one user account to determine a viewing pattern for video programs, wherein the video service usage data identifies content including video programs selected, recorded, or viewed in association with the at least one account;

determine whether a prospective billing plan is more closely aligned based on cost savings with the viewing pattern for video programs than a current billing plan; and output a message regarding an availability of the prospective billing plan in response to a determination that the prospective billing plan is more closely aligned with the viewing pattern for video programs than the current billing plan.

10. The device of claim 9, wherein the processor is further configured to:

identify an access fee associated with at least one user account for at least one user device in a network; and determine a combined billing for the at least one user account based on the usage based billing and the access fee.

11. The device of claim 9, wherein when determining whether the current time substantially corresponds to the initial billing time, the processor is further configured to:

identify the initial billing time as a broadcast time for the at least one video program, wherein the broadcast time is a time during which the at least one video program is initially received; and determine whether the current time substantially corresponds to the broadcast time.

12. The device of claim 9, wherein when identifying the initial billing time, the processor is configured to:

identify a plurality of times that the at least one video program is viewed by a plurality of user devices;

determine a first time during which the at least one video program is viewed based on the plurality of times that the at least one video program is viewed by the plurality of user devices; and identify the first time as the initial billing time.

13. The device of claim 9, wherein identifying the initial billing time associated with the at least one video program, the processor is further configured to:

determine whether the program is one of a pay per view (PPV) program or a video on demand (VOD) program; and identify a time during which the at least one video program is viewed as the initial billing time in response to a determination that the program is not one of a PPV program or a VOD program.

14. The device of claim 9, wherein when identifying the current time during which the at least one video program is viewed, the processor is further configured to:

identify one or more of a view start, a view end, a broadcast start, or a broadcast end, wherein the view start is a time that viewing begins for the at least one video program, the view end is a time that viewing ends for the at least one video program, broadcast start is a time that receiving the at least one video program begins for the at least one video program, and broadcast end is a time that receiving the at least one video program ends for the at least one video program.

15. A non-transitory computer-readable medium including instructions to be executed by a processor, the instructions including one or more instructions, when executed by the processor, for causing the processor to:

identify a current time during which at least one video program is viewed by at least one device associated with at least one user account, wherein the current time that the at least one video program is viewed is a span of time from a start of viewing the at least one video program to an end of viewing the at least one video program;

identify an initial billing time associated with the at least one video program;

determine whether the current time substantially corresponds to the initial billing time;

identify at least one coefficient associated with the at least one video program at the current time in response to a determination that the current time substantially corresponds to the initial billing time;

determine a usage based billing for the at least one user account based on the current time during which the at least one video program is viewed and the at least one coefficient associated with the at least one video program, wherein determining the usage based billing comprises using:

usage based billing=SUM of (CC*TC*EC*viewing time for each program* BC for each of channels 1 to n), wherein CC (channel coefficient) is a coefficient indicator for a type of channel, TC (time coefficient) is a coefficient indicator for a time window during which the at least one video program is viewed, EC (event coefficient) is a coefficient that indicates a particular event, BC (channel billing coefficient) is a coefficient that is set to 0 for channels that are free to air for viewing, and the viewing time for each program is the time that at least one video program is viewed associated with the at least one user account;

identify an access fee associated with at least one user account for at least one user device in a network;

determine a combined billing for the at least one user account based on the usage based billing and the access fee;

analyze video service usage data associated with the at least one user account to determine a viewing pattern for video programs, wherein the video service usage data identifies content including video programs selected, recorded, or viewed in association with the at least one account;

determine whether a prospective billing plan provides savings with the viewing pattern for video programs when compared with a current billing plan; and output a message regarding an availability of the prospective billing plan in response to a determination that the prospective billing plan provides savings with the viewing pattern for video programs when compared with the current billing plan.

16. The non-transitory computer-readable medium of claim 15, where when determining whether the current time substantially corresponds to the initial billing time, the one or more instructions further includes instructions for causing the processor to:

identify the initial billing time as a broadcast time for the at least one video program, wherein the broadcast time is a time at which the at least one video program is initially received; and determine whether the current time substantially corresponds to the broadcast time.

17. The device of claim 9, wherein the processor is further configured to:

receive a request for available video programs that are viewable without additional billing to the at least one user account;

identify at least one previously viewed video program that has been billed within a current billing cycle;

identify at least one recorded video program that has been recorded by a digital video recorder (DVR) associated with the identified at least one previously viewed video program that has been billed within a current billing cycle; and provide information regarding an availability of the available video programs that are viewable without additional billing to the at least one user account that includes the identified at least one previously viewed video program and the identified at least one recorded video program.

18. The computer-implemented method of claim 1, further comprising:

receiving a request for available video programs that are viewable without additional billing to the at least one user account;

identifying at least one previously viewed video program that has been billed within a current billing cycle;

identifying at least one recorded video program that has been recorded by a digital video recorder (DVR) associated with the identified at least one previously viewed video program that has been billed within a current billing cycle; and providing information regarding an availability of the available video programs that are viewable without additional billing to the at least one user account that includes the identified at least one previously viewed video program and the identified at least one recorded video program.

19. The non-transitory computer-readable medium of claim 15, where, when identifying the initial billing time, the one or more instructions further includes instructions for causing the processor to:

identify a plurality of times that the at least one video program is viewed by a plurality of user devices;

determine a first time during which the at least one video program is viewed based on the plurality of times that the at least one video program is viewed by the plurality of user devices; and identify the first time as the initial billing time.

20. The non-transitory computer-readable medium of claim 15, where the one or more instructions further includes instructions for causing the processor to:

determine video service usage data based on the selected video program; and output the video service usage data to a billing device.

* * * * *